US006854812B2

(12) United States Patent
Brake

(10) Patent No.: US 6,854,812 B2
(45) Date of Patent: Feb. 15, 2005

(54) WHEEL AXLE DESIGN OF GAS GRILL

(75) Inventor: George Brake, Dickson, TN (US)

(73) Assignee: Fiesta Gas Grills, LLC, Dickson, TN (US)

( * ) Notice: Subject to any disclaimer, the term of this patent is extended or adjusted under 35 U.S.C. 154(b) by 54 days.

(21) Appl. No.: 10/210,659

(22) Filed: Aug. 1, 2002

(65) Prior Publication Data

US 2003/0025386 A1 Feb. 6, 2003

Related U.S. Application Data

(60) Provisional application No. 60/309,709, filed on Aug. 2, 2001.

(51) Int. Cl.[7] ................................................ B60B 35/00
(52) U.S. Cl. .............................. 301/111.06; 301/111.01; 301/111.06
(58) Field of Search ........................ 301/111.01, 111.02, 301/111.03, 111.04, 111.05, 111.06, 111.07, 112, 121, 122

(56) References Cited

U.S. PATENT DOCUMENTS 1,278,595 A * 9/1918 Cole
5,215,356 A * 6/1993 Lin ........................ 301/111.01
5,277,480 A * 1/1994 Chiu ...................... 301/111.01
5,884,982 A * 3/1999 Yemini ................... 301/111.01
5,902,018 A * 5/1999 Owen et al. ............. 301/111.01
6,361,121 B1 * 3/2002 Morris ......................... 31/112

* cited by examiner

Primary Examiner—Russell D. Stormer
(74) Attorney, Agent, or Firm—Wadde & Patterson; I. C. Wadey, Jr.

(57) ABSTRACT

Disclosed herein is a device for mounting a wheel to the tubular frame of a small appliance. The device includes a sleeve having an elongated body with a proximal end, a distal end, a channel running through the sleeve. A flange extends radially outwardly from the proximal end of the sleeve and a detent on the sleeve is spaced from the flange in the direction of the distal end of the sleeve. A mouth in the sleeve enables the detent to flex inwardly in response to pressure applied radially inwardly against the detent. There is a head at the distal end of the sleeve and a neck connecting the head to the elongated body of the sleeve. The device also includes an axle having an elongated body and opposing ends, with a hub on one end and a nose on the other end. A joint connects the nose to the body of the axle, and the joint is shaped to mate with the neck of the sleeve to lock the axle against axial movement relative to the sleeve.

10 Claims, 6 Drawing Sheets

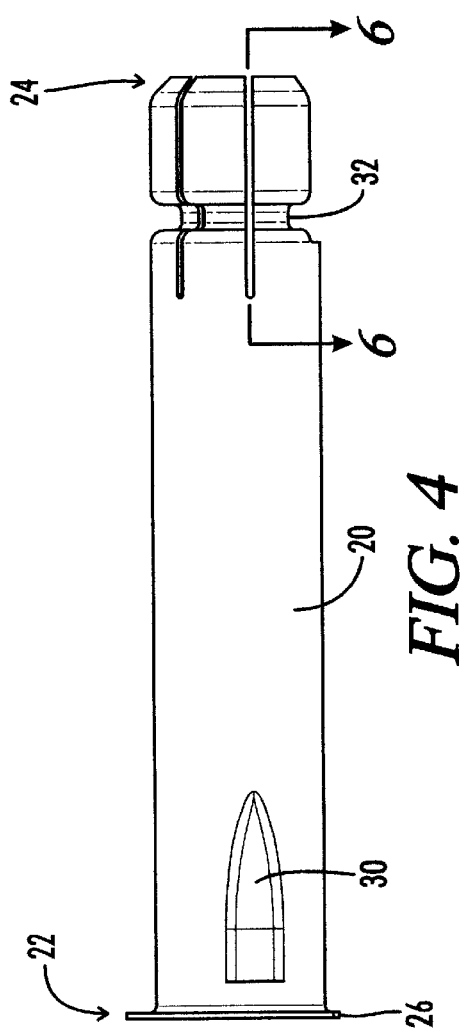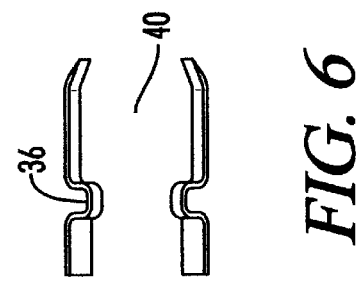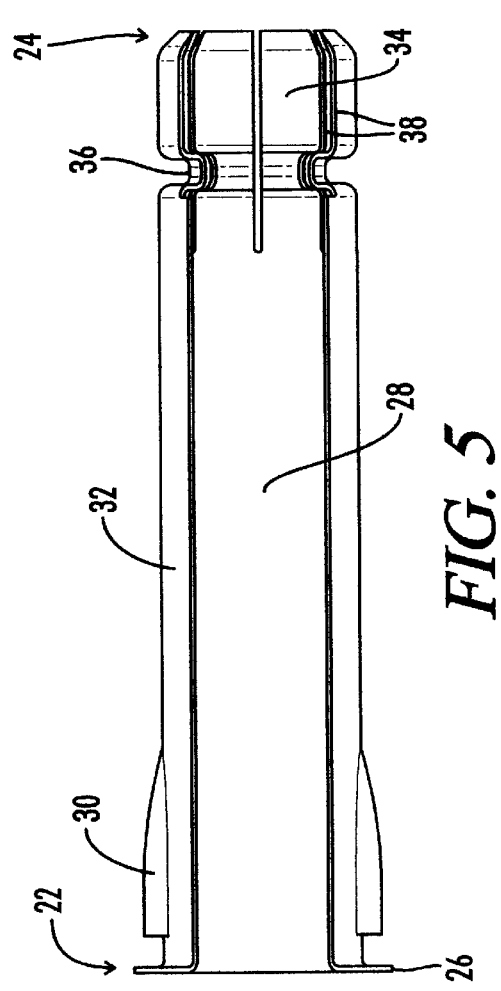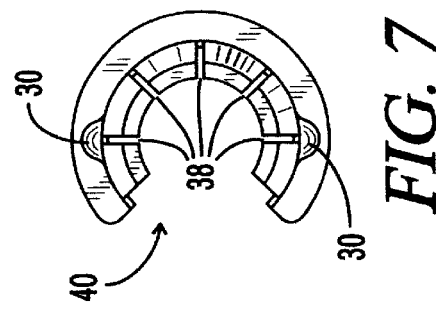

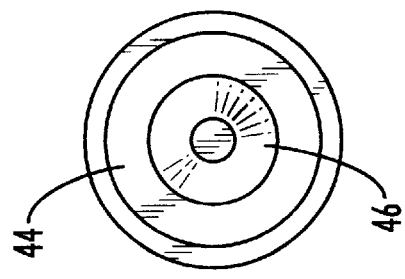
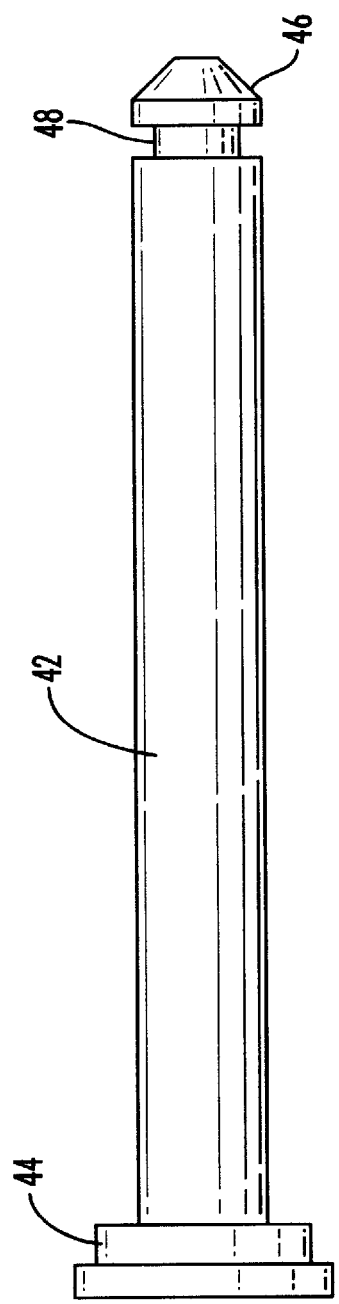
FIG. 9
FIG. 8

WHEEL AXLE DESIGN OF GAS GRILL

This application claims benefit of co-pending U.S. Provisional Patent Application Serial No. 60/309,709 filed Aug. 2, 2001, entitled "Wheel Axle Assembly for Gas Grill" which is hereby incorporated by reference.

Be it known that I, George Brake, a citizen of The United States, residing at 315 Brady Drive, Dickson, TN 37055; have invented a new and useful "Wheel Axle Assembly for Gas Grill".

Be it known that I, George Brake, a citizen of The United States, residing at 315 Brady Drive, Dickson, Tenn. 37055; have invented a new and useful "Wheel Axle Design for Gas Grill".

This invention relates to a wheel axle design for a gas grill, and more specifically, to a wheel axle mounting device that can be installed requiring no tools to be placed in a "locked" position.

BACKGROUND OF THE INVENTION

A variety of household carts and related products are designed with wheels on at least two legs of the carts so that the carts may be conveniently moved to different locations. Such household carts include flower carts, small tables, garbage can carts, garden hose reels, gas grills and the like. These tables and carts generally have tubular legs and at least two of the legs will have wheels attached to them.

Oftentimes, carts of the type for which the device of this application is applicable are shipped to retail outlets in boxes and have to be assembled by the consumer after purchase from the retail outlet. A display cart may be assembled and placed on the floor of the retail outlet so that the customer can view and compare the different products, but once the customer places an order for the product, it is usually delivered to the customer in a carton with the product to be assembled upon the customer returning home. Shipping products in this fashion saves a substantial amount of volume in the shipping process and also makes the product less likely to be damaged during shipping. On the other hand, there is a certain amount of inconvenience to the consumer when the consumer arrives home and has to assemble the product. Many consumers do not have adequate tools to assemble such products and there is a need to have products that can be assembled with a minimum amount of tools or no tools if that is possible.

The present invention is designed to accommodate the need for the ability to attach wheels to a cart or gas grill without requiring any tools. A simple design that can be manufactured easily and inexpensively and yet which will allow the consumer to conveniently connect the wheels to the tubular frame of a cart is highly desirable. Such a product is presently not available in the marketplace. The ability to quickly assemble the wheels to a cart is an attractive feature that makes the cart more readily marketable to the average consumer. Furthermore, the ability to construct a rather inexpensive system for connecting wheels to the tubular legs of carts enables the manufacturer to provide the product at a cheaper price. Finally, the convenience of being able to snap wheels onto the tubular legs of a cart or gas grill without the use of tools enables the consumer to complete the assembly in less time and thus further enhances the marketability of the product.

SUMMARY OF THE INVENTION

The present invention employs a sleeve that passes through holes formed on diametrically opposite sides of the tubular leg of a table or gas grill. The sleeve is an elongated structure having a channel passing through it with a flange on one end and a head on the opposite end. The head is joined to the sleeve by a restricted neck. When the sleeve is passed through the holes in the tubular leg of the table or grill, the flange butts against the tubular leg and stops it axial movement.

To prevent the sleeve from retracting out of the tubular leg, a detent is spaced from the flange and butts against the inside surface of the tubular leg. The detent can be depressed as it passes through the hole in the tubular leg in response to pressure. The detent ramps up from the outside of the sleeve and the pressure as the sleeve is forced through the tubular legs causes the diameter of the sleeve to reduce and allow the detent to enter the inside of the tubular leg. Once the detent passes through the hole, the sleeve expands to cause the detent to but against the inside wall of the tubular leg. A longitudinal mouth extending the length of the sleeve which allows the sleeve to expand and contract in order to enable the detent to move inside the tubular leg.

Once the sleeve is in place, an axle is used to mount the wheel to the tubular leg. The axle has a hub on one end, an elongated body portion and a tapered nose on the other end. First, the axle is passed through the center of the wheel with the wheel butting against the hub on the axle. The axle is then inserted into the sleeve. A joint connects the tapered nose to the elongated body portion of the axle. The joint is designed and shaped to mate with and cooperatively engage the neck of the sleeve. The tapered nose is pushed through the neck and the neck expands until the nose is in the head of the sleeve. At that point, the pressure against the neck is released and the neck pops into engagement with the joint on the axle to hold the axle in position in the sleeve and prevent axial movement of the axle. The neck is allowed to expand because of the slits run axially along the sleeve from the distal end toward the proximal end of the sleeve.

Once the axle is placed inside the sleeve, the wheel is fixedly connected to the tubular leg of the table or gas grill and is held in place for rotational movement about the axle between the hub and the flange. The shape of the axle is designed to mate and cooperate with the channel through the sleeve so that the sleeve acts as a bushing for the axle as it rotates.

BRIEF DESCRIPTION OF THE DRAWINGS

FIG. 4 shows a top view of the sleeve.

FIG. 5 shows a side view of the sleeve.

FIG. 6 shows a section of the sleeve taken along the lines 6—6 of FIG. 4.

FIG. 7 shows an end view of the sleeve.

FIG. 8 shows a side view of the axle.

FIG. 9 shows an end view of the axle.

DESCRIPTION OF THE PREFERRED EMBODIMENTS

Figure 1:
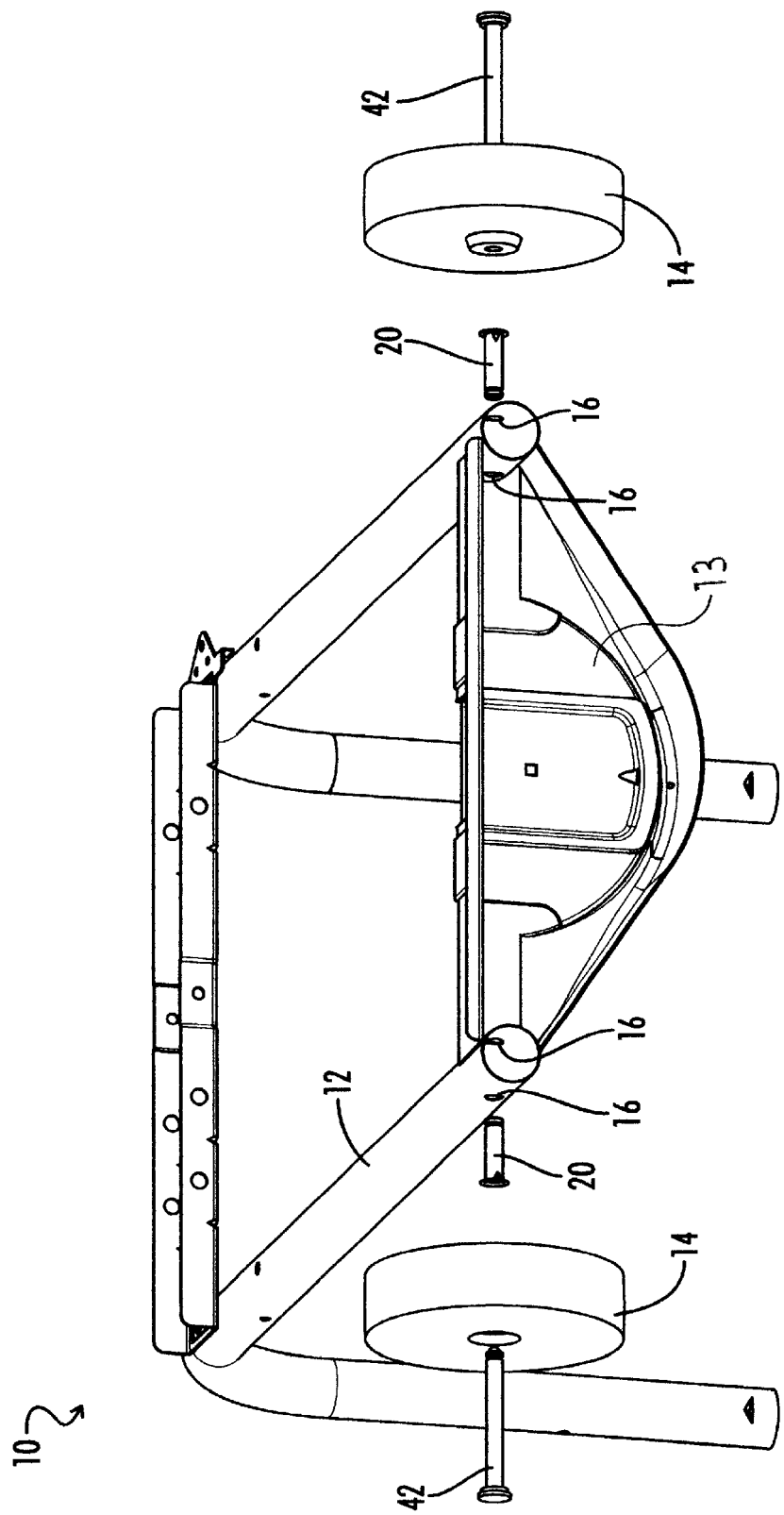
FIG. 1 shows a base of a cart or gas grill with the wheels to be attached to the tubular frame shown in exploded relationship to the frame.

Referring now to the drawings, wherein the referenced numerals referring to parts and used consistently to represent the same elements, the lower portion of a gas grill frame is shown in FIG. 1. The gas grill frame 10 includes a pair of tubular legs 12 and a base 13 on which a propane gas tank will be seated. The two tubular legs are spaced apart and generally will be aligned parallel to each other. Adjacent one end of the tubular leg 12 wheels 14 are mounted using the device of the present invention.

As is seen in FIG. 1, there is a pair of holes 16, 16 in each of the tubular legs 12. The holes 16, 16 are on diametrically opposite sides of the tubular legs and are generally formed so that a line running through the holes would be perpendicular to the axis of the tubular leg.

Figure 2:
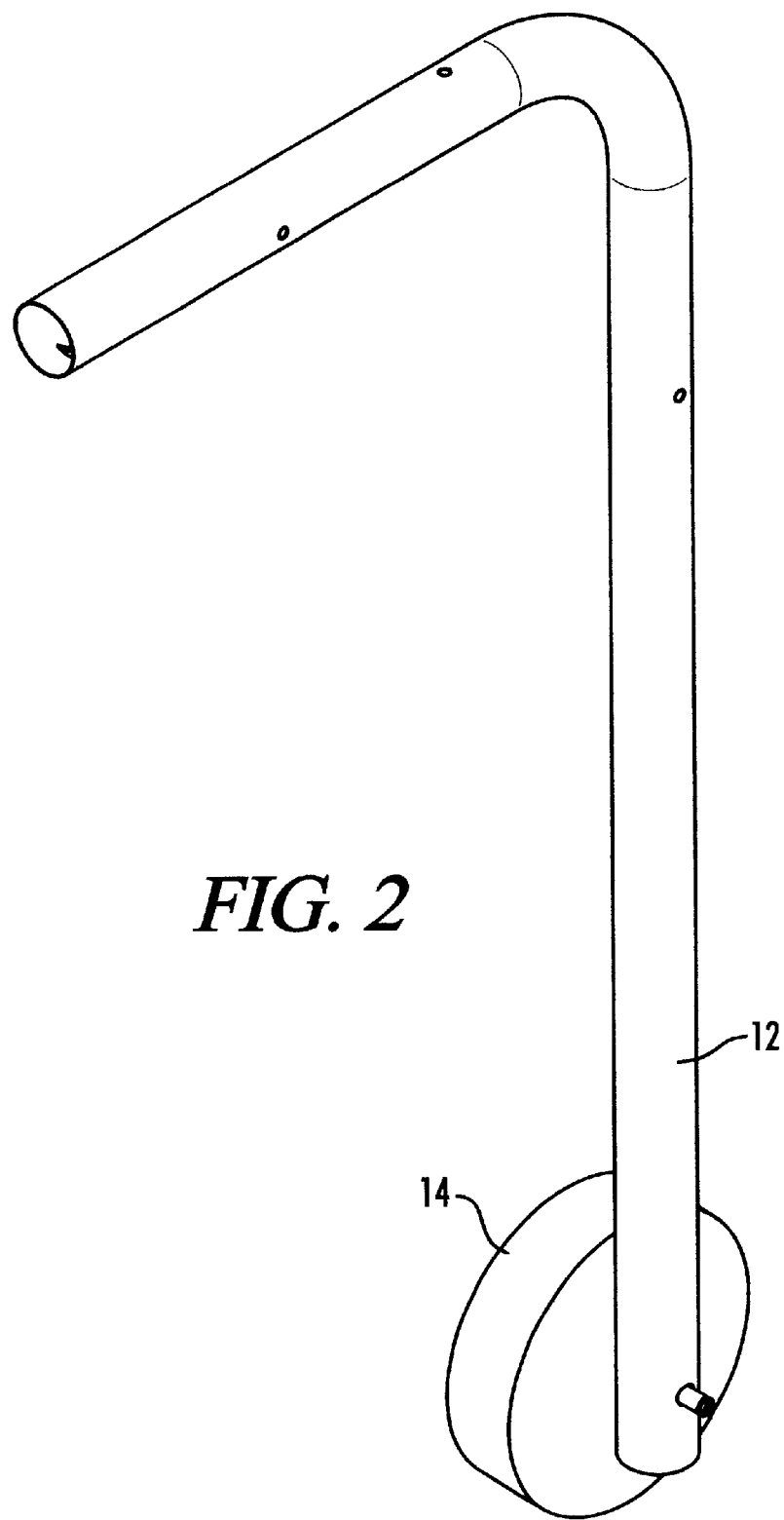
FIG. 2 shows the wheel attached to the tubular frame in greater detail.
Figure 3:
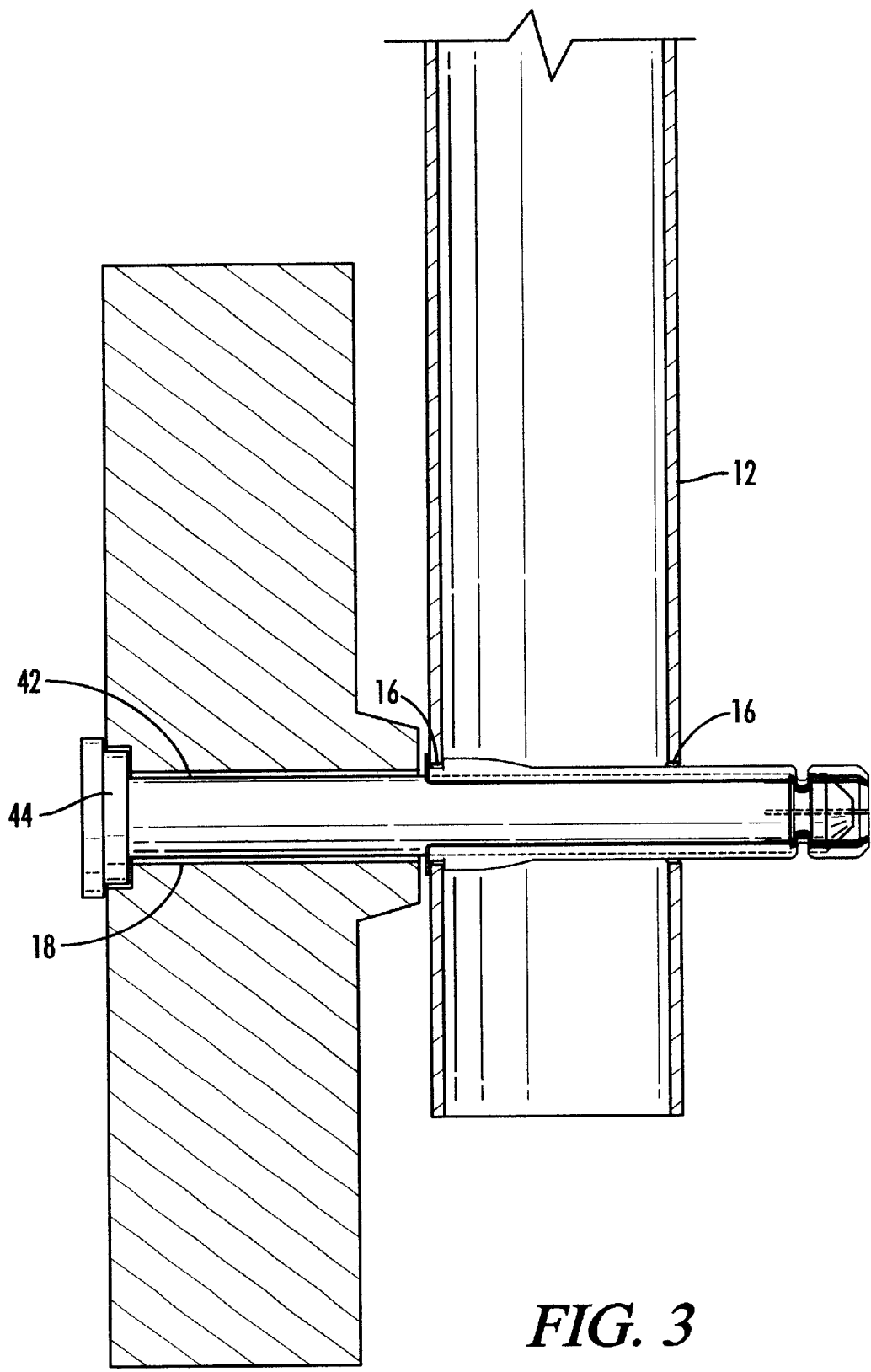
FIG. 3 shows yet another view of the wheel attached to the tubular frame.
Figure 10:
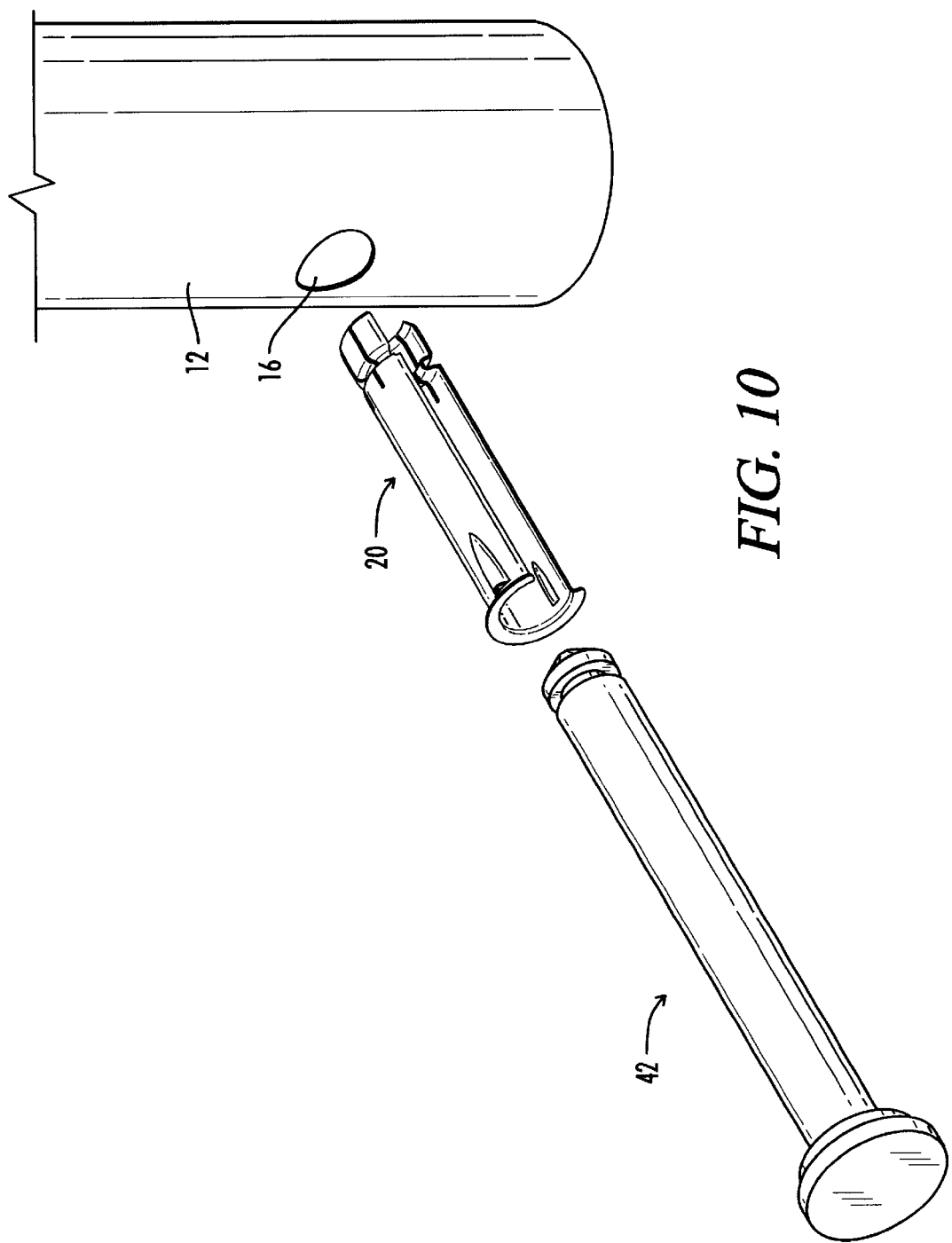
FIG. 10 shows a perspective view of the device of the present invention with the parts in an exploded relationship.

A sleeve 20 is designed to fit through the holes 16, 16. Once the sleeve 20 is in place, the wheel 14 is placed on the axle 42 and abuts against the hub 18 of the axle. The end of the axle extending through the wheel then is inserted into the sleeve and snaps into place to hold the wheel onto the tubular leg 12 of the grill frame 10. FIGS. 2 and 3 show in greater detail, the connection of the wheel 14 to the tubular leg 12.

Turning now to FIGS. 4 through 10, the preferred embodiment of the sleeve will be described in detail. The sleeve 20 has a proximal end 22 and a distal end 24 and elongated body between the two opposing ends. A flange 26 extends from the proximal end 22 of the sleeve 20. The flange can be in a variety of shapes including a disk, dimples, wings or flairs. The purpose of the flange is to keep the sleeve from passing through the tubular leg of the grill. The sleeve is equal to or slightly larger than the hole in the tubular leg and therefore when the sleeve is passed through the holes 16, 16, the flange abuts against the outside surface of the tubular leg 16 and prevents further axial movement of the sleeve. As the sleeve is passed through the tubular leg, the detents 30, which are press formed or stamped into the sleeve, ride against the inner surface of the hole 16. Since the diameter of the sleeve taken across the detent 30 is greater than the diameter of the hole 16, the sleeve must permit the detent to flex inwardly and pass within the diameter of the hole 16. One of the methods of allowing this flexibility is to provide a mouth 40 extending along the length of the sleeve (see FIGS. 7 and 10). With the mouth 40 in communication with the channel 28 and extending along the full length of the sleeve, the sleeve is allowed to flex inwardly so that the detent 30 can pass through the hole 16. Once the detent is passed through the hole 16, the sleeve flexes outwardly to snap the detent against the inner surface of the tubular leg. At this point, the flange 26 engages against the outside of the tubular leg and the detent 30 is engaged against the inside of the tubular leg thus holding the sleeve against axial movement relative to the tubular leg. The flange 26 may take the shape of an arcuate portion of a disc as is illustrated in FIG. 7.

The length of the sleeve 20 is such that the head 34 extends through the second hold 16 in the tubular leg so that the sleeve projects through the tubular leg. The head 34 is connected to the elongated body 32 of the sleeve by a restricted neck 36. The restricted neck 36 acts as an annular dimple and can be expanded in response to pressure applied from the channel 28 radially outwardly because of the slits 38 formed axially in the distal end of the sleeve.

Once the sleeve is in position within the tubular leg of the gas grill frame 10, the wheel 14 is mounted onto the axle 42. The axle 42 has a rim 44 and the axle passes through the hub 18 of the wheel 14 with the rim of the axle engaging the wheel so that the wheel rests against the rim. The elongated axle 42 projects from the wheel and the axle is then inserted into the sleeve 20. At the distal end of the axle 42, there is a tapered nose 46. The tapered nose 46 is connected to the axle 42 by a joint 48. The joint 48, in the preferred embodiment of the invention, is an annular groove that is designed to mate and cooperatively receive the neck of the sleeve.

During assembly, the tapered nose 46 of the axle 42 presses against the inside shoulder of the neck 32 as the axle is being forced through the sleeve. The pressure of the tapered nose causes the neck 36 to expand and the slits 38 in the distal end of the sleeve 20 allow the neck to expand to a point that the tapered nose 46 can pass through the restricted neck 36. Once the tapered nose 46 passes through the restricted area of the neck 36, the neck 36 snaps into place into the joint 48 thus locking the axle in place relative to the sleeve. At this point, the device of the present invention has, without the use of any tools whatsoever, enabled a wheel to be mounted to the tubular frame of a cart, gas grill or the like. The wheel can rotate relative to the frame and the axle is allowed to rotate in the sleeve. The axle and the sleeve are shaped to cooperatively fit so that the sleeve functions as a bushing for the axle. While the neck 36 and the joint 48 have been defined as restricted areas, a reversal of these parts could be accomplished still within the contemplation of this invention. Likewise, a Carter key or similar structure could be used to hold the axle in place within the sleeve if it was so desired.

Although there have been described particular embodiments of the present invention of a new and useful Wheel Axle Assembly of Gas Grill, it is not intended that such references be construed as limitations upon the scope of this invention except as set forth in the following claims.

What is claimed is:

1. A device for mounting a wheel to a tubular frame the device including:
   a sleeve having an elongated body with a proximal end, a distal end, a channel running therethrough, and a flange extending radially outwardly from the proximal end of said sleeve,
   a detent on the sleeve is spaced from said flange in the direction of the distal end of the sleeve;
   a mouth in said sleeve enabling said detent to flex in the direction of said channel in response to pressure applied radially inwardly against said detent;
   a head at the distal end of said sleeve, and a neck connecting said head to said elongated body of said sleeve;
   an axle having an elongated body and opposing ends, with a hub on one end and a nose on the other end;
   a joint connecting the nose to the body of said axle, said joint being shaped to mate with the neck of said sleeve to lock the axle against axial movement relative to said sleeve.

2. The device of claim 1 wherein said flange is an arcuate portion of a disc.

3. The device of claim 1 wherein detent is stamped in said sleeve.

4. The device of claim 1 wherein said neck is expandable in response pressure applied radially outwardly and contracts upon the removable of such pressure.

5. The device of claim 1 wherein said channel and said axle are shaped to cooperatively engage so that the sleeve functions as a bushing for said axle.

6. The device of claim 1 wherein said nose is tapered.

7. The device of claim 1 wherein said joint is a annular groove.

8. The device of claim 1 wherein at least a portion of said head and neck have slits therein to allow said neck to expand in response to pressure.

9. The device of claim 1 wherein said detent is spaced from said flange so as to cooperate with said flange and hold said sleeve in a fixed relationship with respect to a tubular leg when said sleeve is placed through a hole in the tubular leg.

10. The device of claim 9 in combination with a wheel mounted between said rim and said flange.

* * * * *